US012398839B2

(12) United States Patent
Vermeulen et al.

(10) Patent No.: US 12,398,839 B2
(45) Date of Patent: Aug. 26, 2025

(54) ADJUSTABLE LEVELING KIT AND ASSOCIATED INSTALLATION METHOD

(71) Applicant: Aktiebolaget SKF, Gothenburg (SE)

(72) Inventors: Rene Vermeulen, HM Spijkenisse (NL); Abraham Hendrik Hooghart, HM Ridderkerk (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/851,126

(22) Filed: Jun. 28, 2022

(65) Prior Publication Data
US 2023/0011564 A1 Jan. 12, 2023

(30) Foreign Application Priority Data
Jul. 6, 2021 (DE) .......... 102021207060.4

(51) Int. Cl.
*F16M 7/00* (2006.01)
*F16M 5/00* (2006.01)

(52) U.S. Cl.
CPC ................ *F16M 7/00* (2013.01); *F16M 5/00* (2013.01)

(58) Field of Classification Search
CPC .................................. F16M 7/00; F16M 5/00
See application file for complete search history.

(56) References Cited

U.S. PATENT DOCUMENTS

| | | | |
|---|---|---|---|
| 1,380,347 A * | 6/1921 | Blume ................ | F16B 5/0216 248/188.1 |
| 2,940,784 A * | 6/1960 | Fell ..................... | F16M 7/00 52/126.5 |
| 3,144,066 A | 8/1964 | Hecke | |
| 3,361,410 A * | 1/1968 | Messer ................ | F16M 7/00 248/188.4 |
| 3,901,011 A | 8/1975 | Schuster | |
| 4,061,298 A * | 12/1977 | Kober .................. | F16M 7/00 248/188.4 |
| 4,141,527 A | 2/1979 | Wolf | |
| 4,559,986 A | 12/1985 | Svensson et al. | |

(Continued)

FOREIGN PATENT DOCUMENTS

| CN | 205690005 U | 11/2016 |
|---|---|---|
| CN | 207661320 U | 7/2018 |

(Continued)

OTHER PUBLICATIONS https://www.3m.coml3M/en_US/company-us/all-3m-products/~/All-3M-Products/Advanced/Materials/Friction-Shims-Coatings/?N=5002385+8710781+8711017+8745513+3294857497&r1=r3.

(Continued)

*Primary Examiner* — Eret C McNichols
(74) *Attorney, Agent, or Firm* — GARCIA-ZAMOR INTELLECTUAL PROPERTY LAW, LLC; Ruy Garcia-Zamor

(57) ABSTRACT

A kit includes an adjustable chock provided with a first component having screw threads and with a second component having screw threads cooperating with the screw threads of the first component and having a lower bearing surface, and with a bearing element provided with a lower bearing surface in contact with an upper bearing surface of the first component, and with an upper bearing surface. The kit further includes at least one friction ring adapted to be mounted against the lower bearing surface of the second component or against the upper bearing surface of the bearing element.

20 Claims, 2 Drawing Sheets

(56) References Cited

U.S. PATENT DOCUMENTS

| | | | | |
|---|---|---|---|---|
| 4,632,356 A | * | 12/1986 | Munz | F16F 1/3615 248/188.4 |
| 4,887,788 A | | 12/1989 | Fischer et al. | |
| 5,000,416 A | * | 3/1991 | Fantasia | B23Q 1/5462 248/650 |
| 5,080,319 A | * | 1/1992 | Nielsen | F16M 7/00 248/669 |
| 5,511,760 A | * | 4/1996 | Kambara | F16M 7/00 248/188.4 |
| 6,024,330 A | * | 2/2000 | Mroz | F16M 7/00 248/188.4 |
| 6,068,234 A | * | 5/2000 | Keus | F16M 7/00 248/188.4 |
| 6,135,401 A | * | 10/2000 | Chen | F16M 7/00 248/188.4 |
| 6,407,351 B1 | * | 6/2002 | Meyer | F16M 7/00 248/188.4 |
| 6,889,946 B2 | * | 5/2005 | Bizaj | F16M 7/00 248/188.4 |
| 7,232,104 B2 | * | 6/2007 | Krapels | F16M 7/00 248/677 |
| 7,237,364 B2 | | 7/2007 | Tsai | |
| 7,289,315 B2 | | 10/2007 | Hillman et al. | |
| 7,338,035 B2 | | 3/2008 | Tsai | |
| 7,409,799 B2 | | 8/2008 | Tsai | |
| 7,438,274 B2 | * | 10/2008 | Vermeulen | F16M 7/00 248/188.4 |
| 7,472,518 B2 | | 1/2009 | Tsai | |
| 7,717,395 B2 | * | 5/2010 | Rowan, Jr. | F16M 7/00 248/676 |
| 7,819,375 B1 | * | 10/2010 | Johansen | F16M 7/00 248/677 |
| 8,220,770 B2 | * | 7/2012 | Justis | A47L 15/4253 248/677 |
| 8,307,586 B2 | | 11/2012 | Tsai | |
| 8,511,637 B2 | * | 8/2013 | Mitsch | F01D 25/28 248/677 |
| 9,285,067 B2 | * | 3/2016 | Hooghart | F16B 5/0225 |
| 9,410,657 B2 | * | 8/2016 | Vogelaar | F16M 5/00 |
| 9,468,999 B2 | * | 10/2016 | Lustenberger | B23Q 1/0054 |
| 9,810,220 B2 | * | 11/2017 | Ghaisas | F04D 1/00 |
| 10,883,311 B2 | | 1/2021 | Klinglmair et al. | |
| D1,004,404 S | | 11/2023 | Hooghart et al. | |
| 12,000,533 B2 | | 6/2024 | Vermeulen et al. | |
| D1,057,773 S | | 1/2025 | Hooghart et al. | |
| D1,058,619 S | | 1/2025 | Hooghart et al. | |
| 2002/0109054 A1 | * | 8/2002 | Burr | A47B 91/066 248/188.4 |
| 2005/0061946 A1 | * | 3/2005 | Krapels | F16M 7/00 248/677 |
| 2006/0054775 A1 | * | 3/2006 | Rowan, Jr. | F16M 7/00 248/644 |
| 2006/0237622 A1 | * | 10/2006 | Vermeulen | F16M 7/00 248/637 |
| 2008/0056809 A1 | * | 3/2008 | Kielczewski | F16B 5/0233 403/118 |
| 2010/0051763 A1 | * | 3/2010 | Knight, III | E04F 15/0247 248/161 |
| 2010/0240463 A1 | | 9/2010 | Horling | |
| 2014/0060724 A1 | * | 3/2014 | Amato | A47B 91/024 156/92 |
| 2014/0353463 A1 | * | 12/2014 | Ghaisas | F16M 11/24 248/346.06 |
| 2022/0134410 A1 | | 5/2022 | Xu et al. | |
| 2022/0240675 A1 | * | 8/2022 | Hooghart | A47B 91/022 |
| 2022/0243861 A1 | | 8/2022 | Hooghart et al. | |
| 2022/0243862 A1 | * | 8/2022 | Vermeulen | F16M 7/00 |
| 2023/0011564 A1 | | 1/2023 | Vermeulen et al. | |
| 2023/0041643 A1 | * | 2/2023 | Vermeulen | F16B 5/0233 |
| 2023/0297950 A1 | | 9/2023 | Lee | |

FOREIGN PATENT DOCUMENTS

| | | | | |
|---|---|---|---|---|
| CN | 210661956 U | | 6/2020 | |
| DE | 2304132 A | * | 8/1974 | F16B 35/041 |
| DE | 2304132 A1 | * | 8/1974 | F16M 7/00 |
| DE | 2344348 A1 | * | 3/1975 | |
| DE | 3505503 A1 | | 8/1986 | |
| DE | 102008046911 A1 | | 4/2010 | |
| EP | 3742002 A1 | | 11/2020 | |
| FR | 2030000 A5 | | 10/1970 | |
| GB | 1296917 A | | 11/1972 | |
| WO | 2011136635 A1 | | 11/2011 | |
| WO | WO-2012146261 A1 | * | 11/2012 | B23Q 1/0054 |
| WO | WO-2012146266 A1 | * | 11/2012 | F16M 7/00 |

OTHER PUBLICATIONS

Netherlands search repot.
Hardness Conversion Chart of Plastics, Jan. 23, 2017, https://web.archive.org/web/20170123111130/https://plastics.ulprospector.com/properties/hardness-conversion-chart (Year: 2017).
Marlon Blandon: "Chamfers and countersinks halt burr formation," Cutting Tool Engineering, Oct. 10, 2017, pp. 1-8https://www.ctemag.com/news/articles/chamfers-andcountersinks-halt -burr-formation#.

* cited by examiner

ADJUSTABLE LEVELING KIT AND ASSOCIATED INSTALLATION METHOD

CROSS-REFERENCE TO RELATED APPLICATIONS

This application claims priority to German Patent Application no. 102021207060.4, filed Jul. 6, 2021, the contents of which is fully incorporated herein by reference.

TECHNICAL FIELD OF THE INVENTION

The present invention relates to a system configured for use as an adjustable kit for levelling and anchoring a frame of a machine to a support.

BACKGROUND OF THE INVENTION

Adjustable levelling pads or chocks are generally configured to provide both support and vertical alignment capability with or without an associated anchor bolt.

Adjustable chocks are well known in the art.

Reference can be made to FIGS. 1A and 1B which illustrates a known adjustable chock 10.

The adjustable chock 10 is mounted to connect the frame 1 of a machine to a foundation or support 2, for example constructed from concrete or steel. Anchoring the frame 1 of the machine to the support 2 is here done with an anchor bolt 3.

The adjustable chock 10 comprises a first component 11 or shaft element, a second component 12 or annular element and a third component 13 or bearing element. The first, second and third components 11, 12, 13 are coaxial along a vertical axis Z-Z'.

The first component 11 comprises an upper portion 11a and a lower portion 11b provided with an outer screw thread 11c. As illustrated on FIG. 1B, the upper portion 11a has a partly upper surface 11d of concave shape. The first component 11 has a through-hole 14 for accommodating a shank 3a of the bolt 3.

The second component 12 has a second through-hole 12a provided with an inner screw thread 12b configured to engage with the outer screw thread 11c of the first component 11. The threaded portions 11c, 12b cooperate together and provide a vertical adjustment.

The third component 13 sits between the frame 1 of the machine and the upper portion 11a of the first component 11.

As shown in FIG. 1B, the third component 13 has a lower surface 13a engaging with the upper surface 11d of the first component 11. The lower surface 13a and the upper surface 11d are complementarily shaped so as to facilitate slight adjustment of the positions between the first component 11 and the third component 13 relative to one another, for example, in order to accommodate slight deviations from the frame 1 of the machine and the support 2.

The third component 13 has a through hole 16 having a diameter larger than the diameter of the first through-hole 14 in order to allow the shank 3a of the bolt 3 to pass through if an axis of symmetric of the lower surface 11d of the first component 11 is not aligned with an axis of symmetry of the lower surface 13a of the third component 13. This leads to accommodate deviations from horizontal, parallel orientations of the frame 1 of the machine and the support 2.

The chock 10 is sandwiched between the frame 1 of the machine and the support 2 and securely held in place by the bolt 3 and a nut 4 screwed on a part of the shank 3a extending beyond the frame 1 of the machine. The height of the adjustable chock 10 is adjusted by screwing the first component 11 further into or further out of the second component 12.

When installed, the chock 10 is subjected to a mechanical load as a result of the weight of the frame 1 of the machine, and also as a result of reaction forces transmitted by the support 2 and/or by the frame 1.

The axial stiffness of an adjustable chock 10 depends from the axial load capacity and the transverse stiffness depends from transverse load capacity. The axial stiffness can be influenced by the dimensions of the chock 10, mainly by the thread connection between the first and second components 11, 12.

The aim of the present invention is to increase the transverse load capacity of an adjustable chock.

SUMMARY OF THE INVENTION

The invention relates to a kit comprising an adjustable chock provided with a first component having screw threads, with a second component having screw threads cooperating with the screw threads of the first component and having a lower bearing surface, and with a bearing element provided with a lower bearing surface in contact with an upper bearing surface of the first component, and with an upper bearing surface.

The kit further comprises at least one friction ring adapted to be mounted against the lower bearing surface of the second component of the chock, or against the upper bearing surface of the bearing element of the chock.

Accordingly, the friction coefficient between the second component of the chock and the associated support, or the friction coefficient between the bearing element of the chock and the associated machine is increased. This leads to increase the transverse load capacity of the adjustable chock, i.e. the resistance to move in the horizontal direction.

Preferably, the friction coefficient of the at least one friction ring is at least equal to zero point six five (0.65).

Preferably, the kit comprises a first friction ring adapted to be mounted against the lower bearing surface of the second component of the chock, and a second friction ring adapted to be mounted against the upper bearing surface of the bearing element of the chock.

The first friction ring may be sized to cover the entire lower bearing surface of the second component of the chock.

The second friction ring may be sized to cover the entire upper bearing surface of the bearing element of the chock.

Preferably, the lower and upper frontal faces of the first friction ring are provided with a coating having at least one layer and diamond particles embedded in the layer.

Preferably, the lower and upper frontal faces of the second friction ring are provided with a coating having at least one layer and diamond particles embedded in the layer.

For example, the mean diamond particles size may be comprised between 10 μm and 55 μm. The diamond particles concentration on the surface of the layer may be comprised between 8% and 60%.

In one embodiment, the at least one friction ring is a friction shim, for example the friction shim commercialized by the company 3M or by the company Atela.

Alternatively, the at least one friction ring may be a friction disc commercialized by the applicant.

In one embodiment, the friction ring(s) and the chock of the kit are delivered as separate parts. Alternatively, the kit may be delivered as a pre-assembled unit. In this case, each friction ring is mounted against the bearing surface of the associated component of the chock and also secured onto this bearing surface.

The invention also relates to an installation method of the kit as previously defined for levelling and anchoring a machine to a support, wherein the at least one friction ring is axially interposed between the second component and the support of the chock, or axially interposed between the bearing element of the chock and the machine.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention and its advantages will be better understood by studying the detailed description of specific embodiments given by way of non-limiting examples and illustrated by the appended drawings on which.

DETAILED DESCRIPTION OF THE INVENTION

Figure 1A:
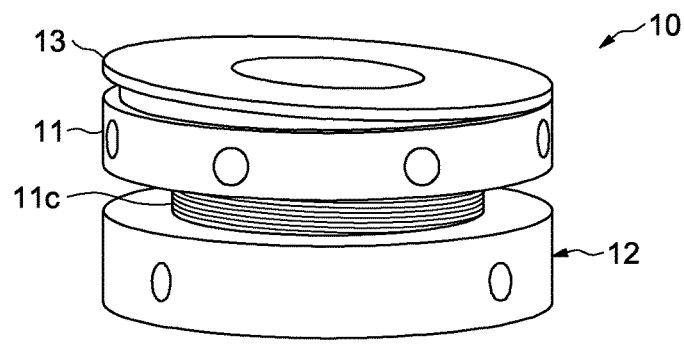
FIG. 1A is a perspective view of a known adjustable chock.
Figure 1B:
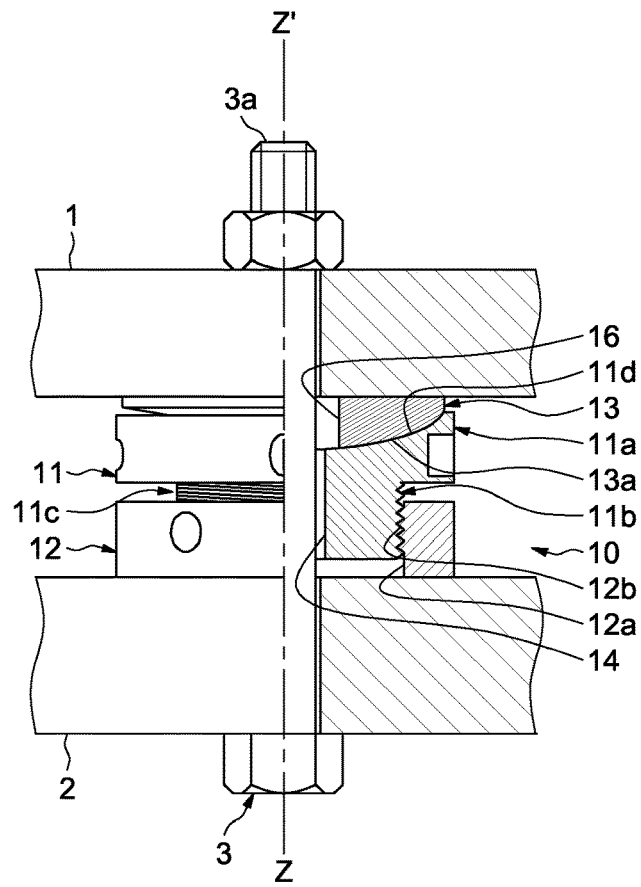
FIG. 1B shows a partial cross-section of the adjustable chock of FIG. 1A in operational use.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by 3 at least twenty (20°) degrees, provides specific literal support for any angle greater than twenty(20°) degrees, such as twenty-three(23°) degrees, thirty(30°) degrees, thirty-three-point five(33.5°) degrees, forty-five (45°) degrees, fifty-two(52°) degrees, or the like and thus provides support for claiming a preferred embodiment with the element moving along the arcuate path thirty three-point five(33.5°) degrees. As shown on FIG. 2, the kit comprises an adjustable chock 100 mounted to connect a frame 1 of a machine to a foundation or support 2. Anchoring the frame 1 of the machine to the support 2 is here done with an anchor bolt 3.

The adjustable chock 100 comprises a first component 110 or shaft element, a second component 120 or lower adjustable part and a third component or bearing element 130. The first, second and third components 110, 120, 130 are coaxial along a vertical axis Z-Z'. The chock 100 is symmetrical relative to the longitudinal axis Z-Z'. The first, second and third components 110, 120, 130 are made, for example, of steel, preferably high-grade steel.

As will be described latter, the kit further comprises first and second friction shims 140, 150 respectively axially mounted between the second component 120 of the chock and the support 2, and between the bearing element 130 of the chock and the frame 1 of the machine. The first and second friction shims 140, 150 and the chock 100 of the kit may be delivered as three separate parts.

The first component 110 of the adjustable chock comprises a lower portion 111 and an upper flange 112. The first component 110 is provided with an outer screw thread 111*b*. The outer screw thread 111*b* is formed on the outer surface of the lower portion 111. The upper flange 112 protrudes radially outwards with respect to the lower portion 111. The upper flange 112 has an upper bearing surface 113 at least partly of upwardly concave shape. The upper surface 113 is rotationally symmetrical. The upper surface 113 forms the upper surface of the first component 110.

The first component 110 has a first through-hole 115 extending axially from the upper surface 113 to a lower surface 114 of the first component 110. The first through-hole 115 has an inner diameter configured for accommodating a shank 3*a* of the bolt 3. The bolt 3 comprises the shank 3*a* and a threaded part 3*b*, for fitted bolts, the shank 3*a* having a diameter bigger than the diameter of the threaded part 3*b*.

The second component 120 of the adjustable chock is provided with a lower bearing surface 121 and an upper surface 122. The lower and upper surfaces 121, 122 axially delimit the second component 120. The lower surface 121 is axially opposite to the upper surface 122. The upper surface 122 is located axially on the side of the upper flange 112 of the first component. The second component 120 is also provided with an inner bore and with an outer surface (not referenced) which are axially delimited by the lower and upper surfaces 121, 122. The bore is provided with inner screw threads 123 configured to engage with the outer screw threads 111*b* of the first component 110. The screw threads 111*b*, 123 cooperate together and provide a vertical adjustment.

Figure 2:
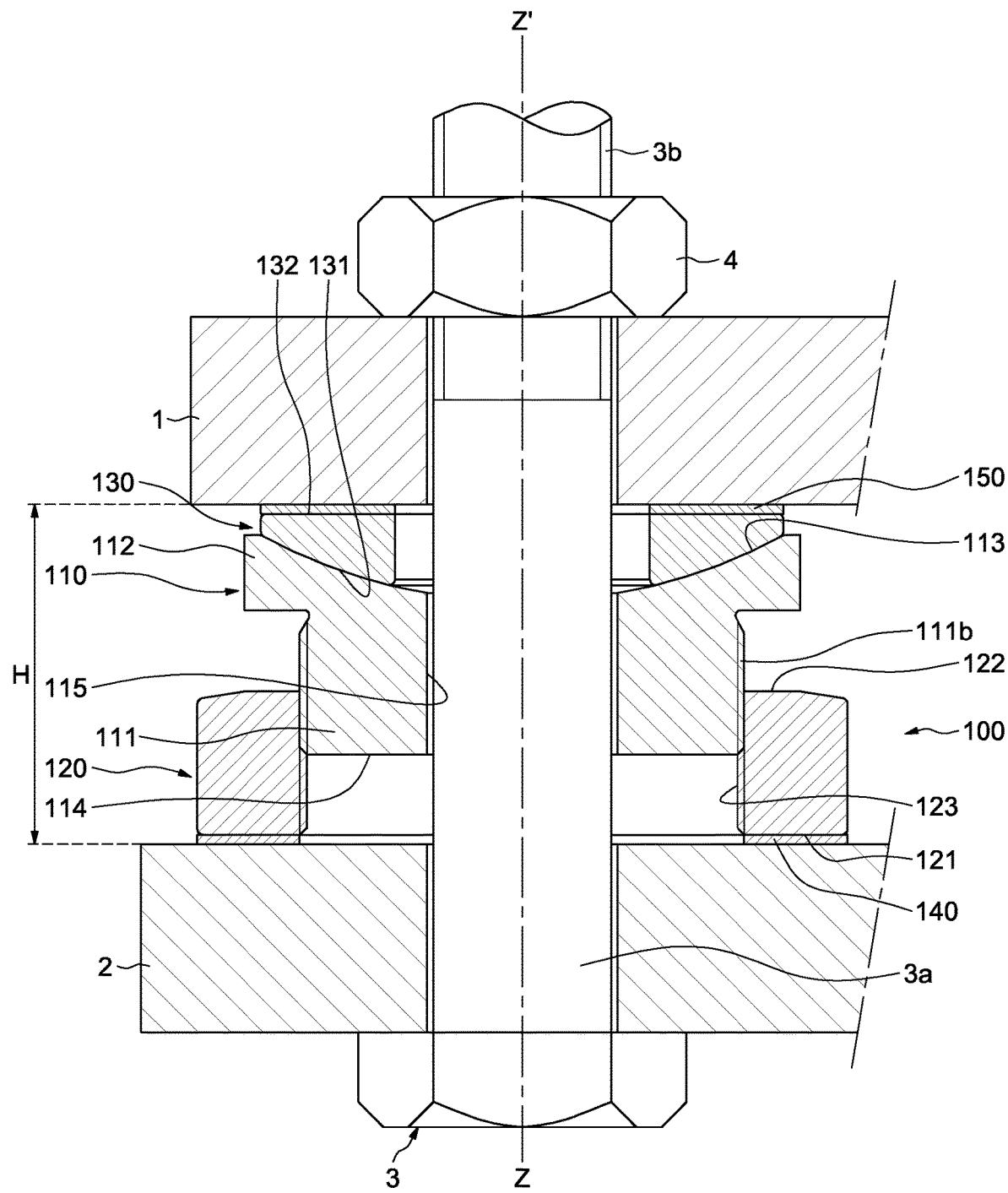
FIG. 2 is a cross-section view of a kit according to an example of the invention, in operational use.

The first component 110 is movable with respect to the second component 120 between a partially screwed position, shown on FIG. 2, in which the threads 111*b* of the first component 110 partially cooperate with the threads 123 of the second component 120 and a totally screwed position, not shown, in which the lower surface of the upper flange 112 of the first component axially abuts against the upper surface 122 of the second component.

As previously mentioned, the first friction shim 140 of the kit is axially mounted between the second component 120 of the adjustable chock and the support 2. The friction shim 140 is axially mounted between the lower surface 121 of the second component and the support 2. The friction shim 140 has an annular form. The friction shim 140 covers the entire lower surface 121 of the second component. The radial dimension of the friction shim 140 is substantially equal to the radial dimension of the lower surface 121.

The friction shim 140 is provided with opposite lower and upper frontal faces which axially delimit the axial thickness of the friction shim. The lower frontal face of the friction shim 140 is in axial contact with the support 2. The upper frontal face of the friction shim 140 is in axial contact with the second component 120.

Preferably, the friction coefficient of the friction shim 140 is at least equal to zero point six five (0.65). For example, the friction shim 140 may comprise a steel substrate and two opposite coating each having a layer, for example a nickel layer, and diamond particles embedded in the layer. For example, the thickness of the steel substrate may be equal to zero point one (0.1) mm. The mean diamond particles size may be comprised between 10 µm and 55 µm. The diamond concentration on the surface layer may be comprised between 8% and 60%. The thickness of each layer may be comprised between 5 µm and 30 µm. Each of the lower and upper frontal faces of the friction shim 140 is formed by the layer and the protruding diamond particles of the coating.

The bearing element 130 of the adjustable chock sits on the first component 110. The bearing element 130 sits on the upper flange 112 of the first component 110. The bearing element 130 is provided with a lower bearing surface 131 and an upper bearing surface 132. The lower surface 131 is axially opposite to the upper surface 132. The lower surface 131 is in contact with the upper surface 113 of the first component. The lower surface 131 has a convex shape and is rotationally symmetrical.

The lower surface 131 and the upper surface 113 are complementarily shaped so as to facilitate slight adjustment of the positions between the first component 110 and the bearing element 130 relative to one another, for example, in order to accommodate slight deviations from the frame 1 of the machine and the support 2.

The radius of curvature of the lower surface 131 of the bearing element 130 corresponds to the radius of curvature of the upper surface 113 of the first component 110. In the illustrated example, the upper bearing surface 132 of the bearing element 130 extends radially.

As previously mentioned, the second friction shim 150 of the kit is axially mounted between the bearing element 130 of the adjustable chock and the frame 1 of the machine. The friction shim 150 is axially mounted between the upper bearing surface 132 of the bearing element and the frame 1. The friction shim 150 sits between the frame 1 and the bearing element 130. The friction shim 150 has an annular form. The friction shim 150 covers the entire upper bearing surface 132 of the bearing element. The radial dimension of the friction shim 150 is substantially equal to the radial dimension of the upper bearing surface 132.

The friction shim 150 is provided with opposite lower and upper frontal faces which axially delimit the axial thickness of the friction shim. The lower frontal face of the friction shim 150 is in axial contact with the bearing element 130. The upper frontal face of the friction shim 150 is in axial contact with the frame 1 of the machine.

Preferably, the friction coefficient of the friction shim 150 is at least equal to zero point six five (0.65). Similarly to the friction shim 140, the friction shim 150 may for example comprise a steel substrate and two opposite coating each having a layer, for example a nickel layer, and diamond particles embedded in the layer. For example, the thickness of the steel substrate may be equal to zero point one (0.1) mm. The mean diamond particles size may be comprised between 10 µm and 55 µm. The diamond concentration on the surface layer may be comprised between 8% and 60%. The thickness of each layer may be comprised between 5 µm and 30 µm. Each of the lower and upper frontal faces of friction shim 150 is formed by the layer and the protruding diamond particles of the coating.

The bearing element 130 of the adjustable chock and the friction shim 150 are able to move with respect to the first component 110 allowing the inclination of the upper frontal face of the friction shim 150 to be adjusted with respect to the bottom surface of the frame 1 of the machine, so that flat contact of the lower frontal face of the friction shim 140 on the support 2 can be achieved, as well as flat contact of the upper frontal face of the friction shim 150 with the bottom surface of the frame 1 of the machine to be supported.

As illustrated, the kit is sandwiched between the frame 1 of the machine and the support 2 and securely held in place by the bolt 3 and a nut 4 screwed on a part of the shank 3a extending beyond the machine 1.

The height H of the kit is adjusted between a minimal total height and a maximal total height by means of screwing the first component 110 further into or further out of the second component 120. Indeed, by rotating the first component 110 with respect to the second component 120, the vertical distance bridged by the kit can be set as desired.

During the installation of the kit between the frame 1 of the machine and the support 2, the friction ring 140 is axially interposed between the second component 120 of the adjustable chock and the support 2, and the friction ring 140 is axially interposed between the bearing element 130 of the adjustable chock and the frame 1. There is no direct contact between the adjustable chock 100 and between the frame 1 and the support 2.

In the illustrated example, the first component 110 of the adjustable chock is provided with an outer screw thread 111b and the second component 120 is provided with an inner screw thread 123. Alternatively, the second component 120 may be provided with an outer screw thread cooperating with an inner screw thread of the first component 110.

The invention claimed is:

1. A kit adapted for use in an adjustable chock, the kit comprising:
    a first component having a first component upper bearing surface, the first component upper bearing surface comprising a flat, axially outermost, radially extending portion;
    a second component threadably engaged with the first component, the second component having a second component lower bearing surface and a second component upper bearing surface, the second component upper bearing surface comprising a radially outermost portion and a radially innermost annular flat portion, the radially outermost portion of the second component upper bearing surface sloping such that an axial length of the second component decreases from a radially outermost point of the radially innermost annular flat portion of the second component upper bearing surface to a radially outermost point of the second component upper bearing surface;
    a bearing element provided with a bearing element lower bearing surface in contact with the first component upper bearing surface, the bearing element lower bearing surface not being in contact with the flat, axially outermost, radially extending portion, the bearing element also having a bearing element upper bearing surface; and
    a friction ring adapted to be mounted against either one of the groups of the second component lower bearing surface and the bearing element upper bearing surface in a way that eliminates a direct contact of the either one of the group of the second component lower bearing surface and the bearing element upper bearing surface with a corresponding one of the group of a supporting surface and a supported surface.

2. The kit according to claim 1, wherein a friction coefficient of the friction ring is at least zero point six five (0.65).

3. The kit according to claim 1, wherein the friction ring comprises a steel substrate.

4. A kit adapted for use in an adjustable chock, the kit comprising:
   a first component having a first component upper bearing surface;
   a second component threadably engaged with the first component and having a second component lower bearing surface;
   a bearing element provided with a bearing element lower surface in contact the first component upper bearing surface, the bearing element having a bearing element upper bearing surface;
   a first friction ring adapted to be mounted against the second component lower bearing surface; and
   a second friction ring adapted to be mounted against the bearing element upper bearing surface.

5. The kit according to claim 4, wherein the first friction ring is configured to cover the entire second component lower bearing surface.

6. The kit according to claim 4, wherein the second friction ring is configured to cover the entire bearing element upper bearing surface.

7. The kit according to claim 4, wherein the first friction ring has lower and upper first friction ring frontal faces, the lower and upper first friction ring frontal faces each provided with a coating, the coating comprising a layer having a plurality of diamond particles embedded therein.

8. The kit according to claim 7, wherein the plurality of diamond particles has a mean size of between ten micrometers (10 μm) and fifty-five micrometers (55 μm).

9. The kit according to claim 7, wherein the plurality of diamond particles occupy between eight percent (8%) and sixty percent (60%) of the layer.

10. The kit according to claim 4, wherein the second friction ring has lower and upper second friction ring frontal faces, the lower and upper second friction ring frontal faces each provided with a coating comprising a layer having a plurality of diamond particles embedded therein.

11. The kit according to claim 4, wherein the first friction ring comprises a steel substrate.

12. The kit according to claim 11, wherein the first friction ring comprises two opposite coatings each having a nickel layer with a plurality of diamond particles embedded therein.

13. The kit according to claim 12, wherein the second friction ring comprises a steel substrate.

14. The kit according to claim 13, wherein the second friction ring comprise two opposite coatings each having a nickel layer with a plurality of diamond particles embedded therein.

15. A method for levelling and anchoring a machine to a support, the method comprising the steps of:
   providing a first component having a first component upper bearing surface;
   threadably engaging a second component with the first component, the second component having a second component lower bearing surface;
   positioning a bearing element in contact with the first component such that a bearing element lower surface contacts the first component upper bearing surface, the bearing element having a bearing element upper bearing surface;
   positioning first friction ring against the second component lower bearing surface; and
   positioning a second friction ring against the bearing element upper bearing surface.

16. The method according to claim 15, further comprising the step of joining the machine to the support via a fastener which extends through the first friction ring, the second component, the first component, the bearing element, and the second friction ring.

17. The method according to claim 16, adjusting a relative position of the first component and the second component.

18. The method according to claim 16, adjusting a relative position of the first component and the bearing element to level the machine.

19. The method according to claim 16, tightening the fastener so as to secure the relative position between the first component and the second component and to secure the relative position between the first component and the bearing element.

20. A kit adapted for use in an adjustable chock, the kit comprising:
   a first component having a first component upper bearing surface;
   a second component threadably engaged with the first component, the second component having a second component lower bearing surface;
   a bearing element provided with a bearing element lower bearing surface in contact with the first component upper bearing surface, the bearing element also having a bearing element upper bearing surface; and
   a friction ring adapted to be mounted against either one of the group of the second component lower bearing surface and the bearing element upper bearing surface, the friction ring being metallic,
   wherein the friction ring comprises a steel substrate,
   wherein the friction ring comprises two opposite coatings each having a nickel layer with a plurality of diamond particles embedded therein.

* * * * *